No. 897,421. PATENTED SEPT. 1, 1908.
G. STABLES.
BRAKE FOR AUTOMOBILES.
APPLICATION FILED APR. 24, 1907.

3 SHEETS—SHEET 1.

Witnesses
Inventor
Gordon Stables.
By
Attorneys

No. 897,421. PATENTED SEPT. 1, 1908.
G. STABLES.
BRAKE FOR AUTOMOBILES.
APPLICATION FILED APR. 24, 1907.

3 SHEETS—SHEET 2.

Witnesses
C. K. Reichenbach.
John S. Powers

Inventor
Gordon Stables.
By Chandler & Chandler
Attorneys

No. 897,421. PATENTED SEPT. 1, 1908.
G. STABLES.
BRAKE FOR AUTOMOBILES.
APPLICATION FILED APR. 24, 1907.

3 SHEETS—SHEET 3.

Witnesses
C. K. Reichenbach
John Powers

Inventor
Gordon Stables.
By Chandler & Chandler
Attorney

UNITED STATES PATENT OFFICE.

GORDON STABLES, OF PHILADELPHIA, PENNSYLVANIA.

BRAKE FOR AUTOMOBILES.

No. 897,421.   Specification of Letters Patent.   Patented Sept. 1, 1908.

Application filed April 24, 1907. Serial No. 370,009.

*To all whom it may concern:*

Be it known that I, GORDON STABLES, a citizen of the United States, residing at Philadelphia, in the county of Philadelphia, State of Pennsylvania, have invented certain new and useful Improvements in Auto-Brakes; and I do hereby declare the following to be a full, clear, and exact description of the invention, such as will enable others skilled in the art to which it appertains to make and use the same.

This invention relates to new and useful improvements in emergency brakes for automobiles and it has particular reference to a brake including movable shoes which are designed to be engaged beneath the wheels by spring actuated means and to nullify the movement of the wheels.

Figure 1:
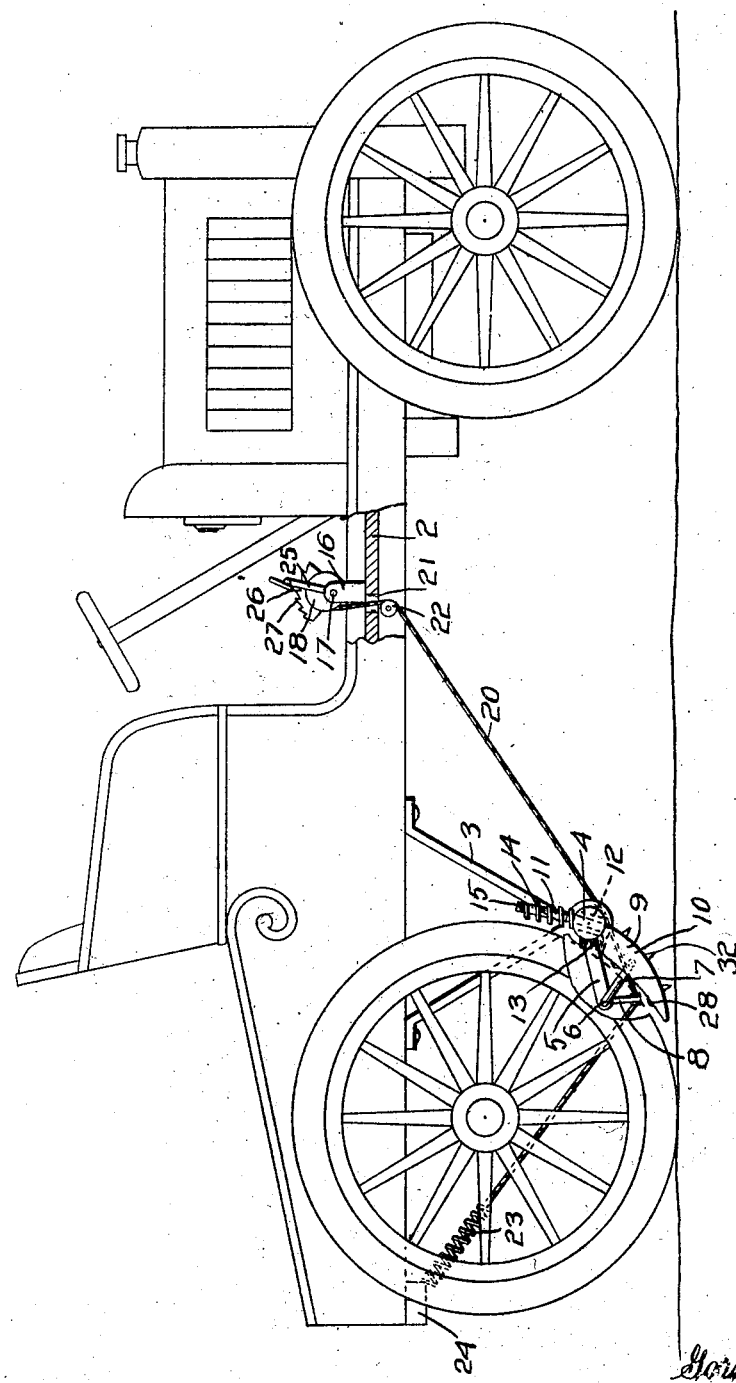
Figure 2:
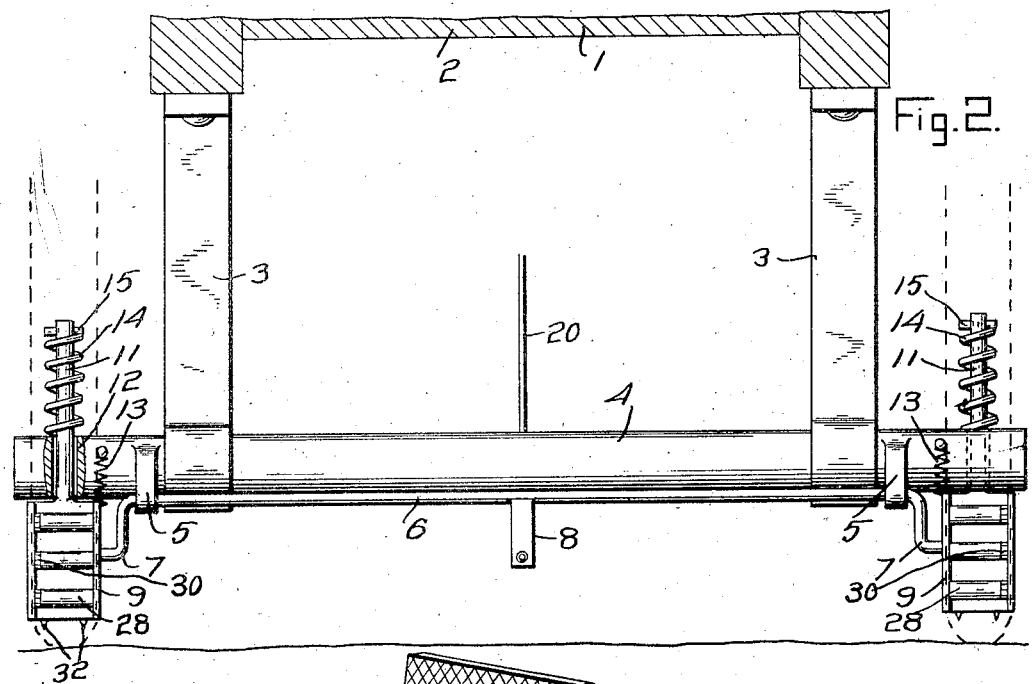
Figure 3:
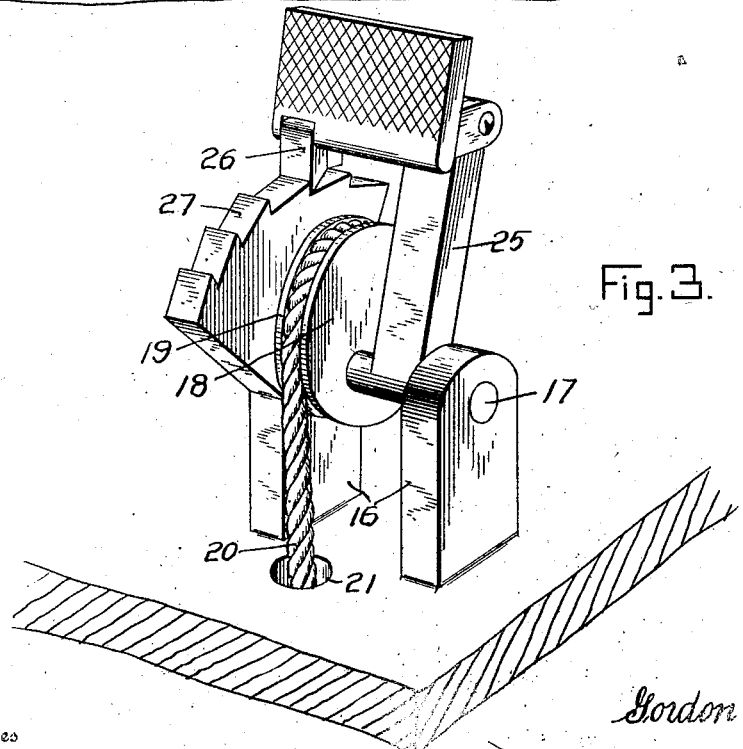
Figure 4:
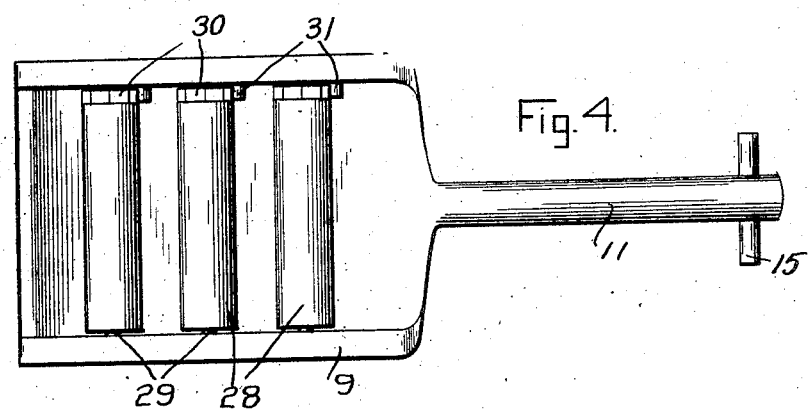
Figure 5:
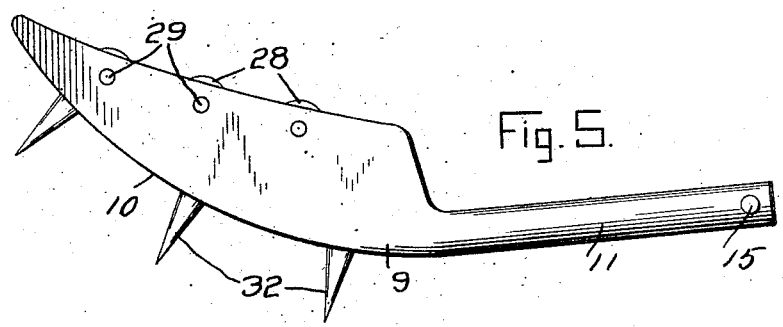

In connection with a brake of the above type the invention aims as a primary object to provide a novel construction, combination and arrangement of parts, the details of which will appear in the course of the following description in which reference is had to the accompanying drawings forming a part of this specification, like characters of reference designating similar parts throughout the several views, wherein:

Figure 1 is a side elevation of a vehicle equipped with a brake constructed in accordance with the present invention. Fig. 2 is a vertical transverse section showing the floor of the vehicle and the brake parts suspended therefrom, the wheels being omitted for clearness of illustration. Fig. 3 is a detailed perspective view illustrating the eccentric pawl controlled wheel for holding and releasing the spring actuated parts, together with the elements associated with and operated by such wheel. Fig. 4 is a top plan view of one of the brake shoes, the entire number being counterparts in construction. Fig. 5 is a side elevation thereof, and Fig. 6 is a detailed sectional view illustrating the rollers mounted in the brake shoes for counteracting the momentum of the wheels, and the pawl and ratchet mechanism employed in connection with such rollers.

Referring specifically to the accompanying drawings the numeral 1 designates the body of an automobile, from the floor 2 of which depend brackets 3, the latter constituting supports for a transverse member 4 disposed forwardly of the rear wheels of the vehicle and provided with rearwardly and downwardly extending bracket bearings 5 in which a rock shaft 6 is journaled, the latter being provided at its ends with downwardly directed cranks 7, and centrally of its length with a downwardly directed arm 8. The cranks 7 have pivotal connection with the side of the adjacent brake shoe 9, the latter being analogous to chock blocks and having curved bottoms 10 between their sides and at their upper ends stems 11 which are loosely projected through enlarged openings 12 formed in the members 4 adjacent the ends thereof. For the purpose of cushioning the shoes 9 in their braking action retractile coil springs 13 are connected therewith and with the members 4 and expansive coil springs 14 surround the stems 11 and with their ends bear against the members 4 and against pins 15 on said stems. The floor 2 also supports an upstanding bracket bearing 16 in which is journaled a rock shaft 17, the latter having eccentric connection with a disk 18 having a grooved periphery 19. A cable 20 is fixed at a selected point on the periphery 19 and is passed through an opening 21 in the floor 2 and over a pulley 22. The cable 20 has connection with the central arm 8 of the shaft 6, and at its rear end is connected to a strong retractile coil spring 23, which is in turn connected to a stationary bracket 24. A lever 25 is fast on the shaft 17 and has a foot operated dog 26 which is designed to engage the teeth of a quadrant 27 supported from the floor 2.

Figure 6:
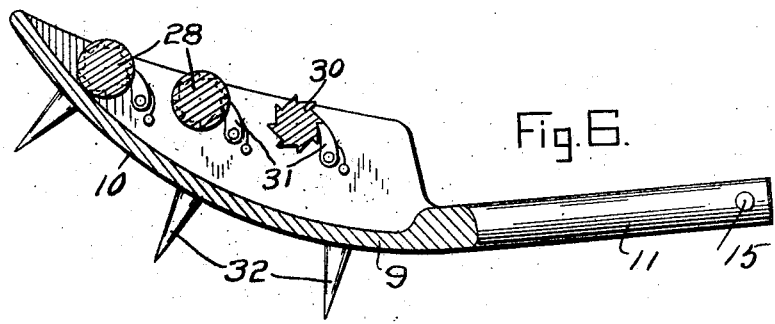

The construction of the shoes 9 is illustrated more particularly in Figs. 4, 5 and 6 from which it will be noted that transverse rollers 28 have their trunnions 29 journaled in the sides of said shoes and are provided at one end thereof with ratchet wheels 30, pawls 31 being pivoted to the shoes 9 for engagement therewith. As the wheels rotate the rollers 28 compensate for their movement and absorb their momentum, but the pawl and ratchet mechanism prevents rotation of the rollers as the machine is backed to release the shoes 9. Said shoes are provided on their underneath surface with spurs 32 which take into the road and nullify the movement of the vehicle.

In operation, assuming that it is desired to bring the vehicle to a sudden stop, the dog 26 is disengaged from the quadrant 27 at which time the spring 23 draws the cable 20 rearwardly, said cable paying off from the disk 18. In this action of the cable the shaft 6 is rocked and by virtue of the connections described the shoes 9 are thrown under the wheels so that their rotation is without effect and the vehicle comes to a sudden stop. To release the shoes the reverse gear is thrown in at which time, owing to the backward rotation of the wheels, the parts may be restored to their normal positions by pushing the lever 25 forwardly, the pawl 26 preventing its escape and holding it at any position to which it may be set.

From the foregoing description it will be seen that simple and efficient means are provided for accomplishing the objects of the invention, but, while the elements herein shown and described are well adapted to serve the functions set forth, it is obvious that various minor changes may be made in the proportions, shape, and arrangement of the several parts, without departing from the spirit and scope of the invention as defined in the appended claims.

What is claimed, is:

1. A brake of the type set forth, comprising a rock shaft having cranks at its ends, brake shoes pivoted to said cranks, a transverse member formed with openings, said brake shoes having stems projecting through said openings as guides, pins carried by the stems above the transverse member, coil springs embracing the stems and bearing against the pins and transverse member, spring actuated means for rocking said shaft, and means for holding said shaft normally against movement by said spring actuated means.

2. A brake of the type set forth, comprising a rock shaft having cranks at its ends, brake shoes pivoted to said cranks, a transverse member formed with openings, said brake shoes having stems projecting through said openings as guides, spring actuated means for rocking said shaft to move said shoes beneath the wheels and means for holding said shaft normally against movement by said spring actuated means.

3. A brake of the type set forth, comprising a rock shaft having cranks at its ends, brake shoes pivoted to said cranks, a transverse member formed with openings, said brake shoes having stems projecting through said openings as guides, pins carried by the stems above the transverse member, coil springs embracing the stems and bearing against the pins and transverse member, retractile springs connecting the shoes and the transverse member, spring actuated means for rocking said shaft, and means for holding said shaft normally against movement by said spring actuated means.

In testimony whereof, I affix my signature, in presence of two witnesses.

GORDON STABLES.

Witnesses:
GEORGE C. CUNNEY,
M. A. QUINLAN.